United States Patent [19]

Nemeth

[11] Patent Number: 4,743,510
[45] Date of Patent: May 10, 1988

[54] METHOD OF PREVENTING THE BUILD-UP OF STATIC ELECTRICITY IN LAMINATED CORK FLOOR-TILES AND AN ANTI-STATIC CORK FLOOR-TILE

[75] Inventor: Josef Nemeth, Kungälv, Sweden

[73] Assignee: Wicanders AB, Alvangen, Sweden

[21] Appl. No.: 903,932

[22] Filed: Sep. 5, 1986

[30] Foreign Application Priority Data

Jan. 7, 1986 [SE] Sweden ............................... 8600069

[51] Int. Cl.$^4$ .............................................. B32B 9/04
[52] U.S. Cl. ..................................... 428/455; 428/50; 428/922
[58] Field of Search ............... 428/50, 922, 532, 537.1, 428/455; 404/34, 44

[56] References Cited

U.S. PATENT DOCUMENTS 3,746,573 7/1973 Hotta et al. ..................... 428/922 X
3,764,376 10/1973 Wagner et al. .................. 428/922 X

*Primary Examiner*—Alexander S. Thomas
*Attorney, Agent, or Firm*—Armstrong, Nikaido, Marmelstein & Kubovcik

[57] ABSTRACT

In order to prevent the build-up of static electricity in laminated cork floor tiles consisting of a layer of granular cork bonded by a binder and a wear surface preferably composed of polyvinyl chloride foil, provided on one side of the granular layer, the electrical conductivity of the laminate is increased by incorporating agents to reduce electrical resistance in the binder included in the cork layer and by incorporating antistatic agents in the wear surface. The tiles may have a moisture barrier provided on the side of the granular cork layer opposite the wear surface, the moisture barrier also incorporating an agent or agents reducing the electrical resistance thereof.

20 Claims, No Drawings

METHOD OF PREVENTING THE BUILD-UP OF STATIC ELECTRICITY IN LAMINATED CORK FLOOR-TILES AND AN ANTI-STATIC CORK FLOOR-TILE

BACKGROUND OF THE INVENTION

The present invention relates to a method of preventing the build-up of static electricity in laminated cork floor-tiles comprising a layer of granular cork bonded by a binder and a wear surface provided on one side of the granular layer. The invention also relates to an antistatic cork floor-tile.

Laminated cork floor-tiles of the above-mentioned type are fitted together to form flooring which, in comparison with other types of flooring, has high elasticity and yields comfortably when walked upon. Such flooring is therefore particularly suitable for use in working environments where personnel have to walk about a good deal since the use of such flooring avoids the strain and stress on legs and back caused by the rigidity of other types of flooring materials. Flooring composed of cork tiles is also aesthetically attractive and provides good thermal insulation.

However, laminated cork tiles used hitherto have the drawback of having low electrical conductivity, causing people and apparatus to become charged with static electricity. It has therefore been impossible to use these tiles in environments in which the build-up of static electricity must be avoided. Such environments are, for example, rooms where explosives or inflammable substances are handled and where a spark might have disastrous results, or premises containing sensitive electronic apparatus such as computer equipment. Until now it has been necessary to use, in such environments, unyielding flooring of, for instance, PVC, the electrical conductivity of which has been increased by various additives. The lower surface of such flooring has been connected to earth at various points.

Attempts have previously been made to increase the conductivity in the wear surface of the work tiles of the type referred to above, which wear surface normally consists of transparent PVC. However, this measure is insufficient to prevent the build-up of static electricity since the electrical charge must be conducted over long distances along the thin wear surface parallel to the floor, across joints creating resistance to the passage of electricity and the overall electrical resistance is therefore too high despite the increased conductivity of the wear surface. It is also possible to reduce resistance to a certain extent by permitting the PVC-based wear surface to cover the edges of the tile and by using a PVC layer on the lower side of the tile as a moisture barrier, this layer, like the layer forming the wear surface and the layer covering the edges also including resistance-reducing additives. The charge will therefore be conducted between the joints, down to the moisture barrier and on to earth. However, not even this measure is sufficient since the combined cross section of the joints is insufficient to conduct the static electricity away. Furthermore, an extra manufacturing stage would be required, entailing added expense, to coat the side edges of the tiles with a layer of PVC once they had been cut to shape.

SUMMARY OF THE INVENTION

The object of the invention is to achieve a laminated floor-tile of the type described in the introduction, in which the principal layer comprising a layer of granular cork having considerably higher electrical conductivity than traditional floor-tiles, thus preventing the build-up of static electricity.

According to the invention this object is achieved by incorporating in the binder included in the cork layer, an agent adapted to reduce electrical resistance and by incorporating an antistatic agent in the wear surface.

DESCRIPTION OF THE PREFERRED EMBODIMENTS

In a preferred embodiment of the invention the laminate is provided with a moisture barrier containing polyvinyl chloride polymer, filler, elasticizer and agents reducing electrical resistance or alternatively the moisture barrier comprises an electrically conducting layer of varnish, suitably consisting of polyvinyl chloride vinyl acetate.

The binder in the granular cork layer suitably consists of curable polyones such as phenolic resin, the content of binder being between 5 and 25 percent by weight, preferably 10 percent by weight, calculated on the weight of the laminated layer.

Carbon black is preferably used as an agent to reduce electrical resistance. The binder then suitably contains 0.1–5 percent by weight, preferably 2 percent by weight, carbon black and 1–10 percent by weight, preferably 5 percent by weight, of polyols, calculated on the weight of the laminated layer.

The wear surface suitably contains 0.1–5 percent by weight, preferably 2 percent by weight, antistatic agent of the ethylene oxide condensate type, sulphonated amide derivative type or the like.

Various laminated tiles manufactured in accordance with the invention have been compared with respect to the antistatic effect with traditional or cork tiles. Measurements determining the vertical resistance were carried out in accordance with recommended ISO standards for measuring electrical resistance in textile floor materials (according to "ISO, ORGANISATION INTERNATIONALE DE NORMALISATION COMITE TECHNIQUE ISO/TC 38 "Textiles" ISO/TC 38/SC 12/GT 5").

A traditional laminated cork floor-tile, consisting of a granular layer of cork bonded by a phenolic resin binder, was tested. The upper surface of the cork was coated with a tine wear surface of plasticized, transparent PVC and its lower side was coated with a thin layer of plasticized PVC containing filler as a moisture barrier. The total thickness of the cork tile was 3.2 mm.

The vertical resistance was measured in accordance with recommended ISO standards at several points on the tile. The mean value was $300 \times 10^9$ ohm.

EXAMPLE 1

Measurement in accordance with above-noted ISO standard was performed on a cork floor-tile manufactured in accordance with the invention, of the same thickness as that used for comparison. The cork layer contained 10 percent by weight phenolic resin as a binder. This binder contained 2 percent by weight carbon black and 5 per cent by weight diethylene glycol as a resistance-reducing agent. The cork layer was coated with a PVC foil to provide a wear surface containing 2 percent by weight antistatic agent of the ethylene oxide condensate type as resistance-reducing agent. The lower side of the cork layer was provided with a moisture barrier containing, besides PVC polymer, 40 percent by weight chalk as filler, 16 percent by weight of the plasticizer DIP and 2 percent by weight carbon black as resistance-reducing agent. The PVC resin itself was a mixture of 75% suspension PVC and 25% emulsion PVC.

The mean value of the resistance was $10 \times 10^9$ ohm, this being 30 times lower than in the comparison example.

EXAMPLE 2

Resistance measurement in accordance with the above-noted ISO standard was carried out on a cork tile manufactured in accordance with the invention and having the same dimensions and composition as in Example 1 except that the binder contained 5% glycerine instead of diethylene glycol.

In this case the mean value of the resistance was $11 \times 10^9$ ohm.

EXAMPLE 3

A cork tile manufactured in accordance with the invention and having the same dimensions as in Example 1 and the same composition of the cork layer and the moisture barrier was measured. The wear surface of the cork layer contained the same components as in Example 1 but the quantity of antistatic agent was increased to 3%. The mean value of the resistance was $3 \times 10^9$ ohm.

EXAMPLE 4

A cork tile manufactured in accordance with the invention and having the same thickness as in Example 1, the cork layer and the wear surface being identical to the cork layer and the wear surface in Example 1 was measured. The lower side of the cork layer was treated with a varnish consisting of PVC vinyl acetate copolymer with 3% carbon black added as resistance-reducing agent.

The mean value of the measured resistances in this case was $0.6 \times 10^9$ ohm.

The invention is not limited to the examples described above. It can be varied in many ways within the scope of the following claims.

I claim:

1. A method of preventing build-up of static electricity in laminated cork floor-tile comprising a layer of granular cork, a binder bonding the granular cork layer, a wear surface provided on one side of the granular layer, and moisture barrier on the side of said granular layer opposite to said wear surface, the method comprising the steps of incorporating an agent adapted to reduce electrical resistance in the binder including in the cork layer, incorporating an agent adapted to reduce electrical resistance in the moisture barrier and incorporating an anti-static agent in the wear surface.

2. A method according to claim 1, in which the moisture barrier comprises an electrically conducting layer of varnish.

3. A method according to claim 1, in which said layer of varnish comprises polyvinyl chloride vinyl acetate copolymer.

4. A method according to claim 1, in which the binder in the granular cork layer consists of curable polyones.

5. A method according to claim 4, in which the binder includes phenolic resin.

6. A method according to claim 4, in which the binder includes carbamide resin.

7. A method according to claim 4, in which the binder includes melamine resin.

8. A method according to claim 4, in which the binder includes polyurethanes.

9. A method according to claim 4 in which the content of binder is between 5 and 25 percent by weight, calculated on the weight of the layer of cork.

10. A method according to claim 4 in which the content of binder is 10 percent by weight, calculated on the weight of the layer of cork.

11. A method according to claim 4, in which carbon black and polymers are used as agents to reduce resistance in the binder.

12. A method according to claim 11, in which the binder contains 0.1-5 percent by weight carbon black and 1-10 percent by weight polyol, calculated on the weight of the layer of cork.

13. A method according to claim 11 in which the binder contains 2 percent by weight carbon black and 5 percent by weight polyol, calculated on the weight of the layer of cork.

14. A method according to claim 4, in which diethylene glycol is used in the binder.

15. A method according to claim 4, in which glycerol is used in the binder.

16. A method according to claim 4, in which polyethylene glycol is used in the binder.

17. A method according to claim 1, in which the wear surface contains 0.1-5 percent by weight antistatic agent of the ethylene oxide condensate type.

18. A method according to claim 1, in which the wear surface contains 0.1-5 percent by weight antistatic agent of the sulphonated amide derivative type.

19. A laminated cork floor-tile including a layer of granular cork, a binder bonding the granular cork layer, a wear surface provided on one side of the granular layer, and a moisture barrier provided on the side of said granular layer opposite to said wear surface, in which the binder in the cork layer contains an agent adapted to reduce electrical resistance, the wear surface includes an antistatic agent, and the moisture barrier contains an agent adapted to reduce electrical resistance.

20. A floor-tile according to claim 19, in which the mean resistance of the laminate is at most $20 \times 10^9$ ohm.

* * * * *